(12) United States Patent
Cosgriff et al.

(10) Patent No.: US 6,745,244 B1
(45) Date of Patent: Jun. 1, 2004

(54) METHOD AND SYSTEM FOR INTEGRATED WIRELINE AND WIRELESS SERVICES IN A SWITCHING SYSTEM

(75) Inventors: Barbara Cosgriff, Apex, NC (US); William Gentry, Cary, NC (US); R. Emery Hanzel, Apex, NC (US); Patrick Lee Price, Fuquay-Varina, NC (US); James Ziesig, Apex, NC (US); Chandrakant Gundecha, Raleigh, NC (US); Gary Steven Franks, Chapel Hill, NC (US)

(73) Assignee: Nortel Networks, Ltd., St. Laurent (CA)

( * ) Notice: Subject to any disclaimer, the term of this patent is extended or adjusted under 35 U.S.C. 154(b) by 0 days.

(21) Appl. No.: 10/319,946

(22) Filed: Dec. 16, 2002

Related U.S. Application Data

(62) Division of application No. 09/261,321, filed on Mar. 3, 1999, now Pat. No. 6,704,796.

(51) Int. Cl.$^7$ .............................................. G06F 13/00
(52) U.S. Cl. ...................... 709/227; 709/225; 709/249; 379/93.09; 379/219
(58) Field of Search ................................ 709/219, 223, 709/225, 227, 229, 237, 249, 250, 318; 379/93.09, 114.01, 114.28, 201.01, 219; 719/311

(56) References Cited

U.S. PATENT DOCUMENTS

| | | | | |
|---|---|---|---|---|
| 5,422,936 A | * | 6/1995 | Atwell ........................ 379/88 |
| 5,524,145 A | * | 6/1996 | Parker ........................ 379/197 |
| 5,745,553 A | * | 4/1998 | Mirville et al. ................ 379/67 |
| 5,758,281 A | * | 5/1998 | Emery et al. ................ 455/428 |
| 5,867,562 A | * | 2/1999 | Scherer ........................ 379/88 |
| 6,430,282 B1 | * | 8/2002 | Bannister et al. ....... 379/211.02 |

\* cited by examiner

*Primary Examiner*—Viet D. Vu
(74) *Attorney, Agent, or Firm*—John C. Gorecki, Esq.

(57) ABSTRACT

Methods and systems consistent with the present invention perform enhanced services for wireline and wireless subscribers in an integrated wireline and wireless switching system. The enhanced services may include, for example, group dialing plans, message waiting indicator activation, call forwarding, simultaneous ringing, call conferencing, calling line identification, automatic call back, automatic recall, speed dialing services, and/or any other services that may be provided by a switching system to wireless and/or wireline subscribers. When a calling wireline and/or wireless subscriber requests one or more of the enhanced services, the integrated wireline and wireless switching system determines the line types associated with the wireline and/or wireless devices of a called subscriber, and identifies references to one or more shared procedures for performing the enhanced services according to the determined line types without creating direct dependencies between wireline and wireless modules in the integrated wireline and wireless switching system. Finally, the integrated wireline and wireless switching system executes the identified procedures to perform the shared services.

12 Claims, 16 Drawing Sheets

METHOD AND SYSTEM FOR INTEGRATED WIRELINE AND WIRELESS SERVICES IN A SWITCHING SYSTEM

CROSS-REFERENCE TO RELATED APPLICATIONS

This application is a divisional of application Ser. No. 09/261,321, filed Mar. 3, 1999, now U.S. Pat. No. 6,704,796.

This application is related to U.S. application Ser. No. 09/072,828, filed May 15, 1998, the contents of which are incorporated herein by reference.

FIELD OF THE INVENTION

The present invention generally relates to wireline and wireless switching systems, and more particularly, to a method and system for integrated wireline and wireless services in a switching system.

BACKGROUND OF THE ART

Wireline switching or conventional telephony switching has evolved over time with a very well-developed set of protocols, standards, and network topologies. Wireless switching, however, has evolved with yet a different set of protocols, standards, and network topologies. Some of the differences between wireless and wireline switching are unavoidable given the different communication media involved in the different technologies. Nonetheless, the differences in the two systems have largely resulted in disparate systems for switching wireless calls and wireline calls throughout the public telecommunication network.

The public wireless network and the public wireline network obviously must connect together at various points, as wireless subscribers and wireline subscribers need to be able to communicate with each other. Presently, this intercommunication between the two types of networks is accomplished through specialized complexes of hardware. Such a hardware complex includes a wireline telecommunication switch and a wireless telecommunication switch together with specialized network hardware to tie the two together. The problem with these hardware complexes is that they require a separate hardware platform, which in turn requires additional space, power, and maintenance. Additionally, software resources and processing resources are wasted because the wireline and wireless switches have many elements in common.

To address the problems of the prior art, U.S. application Ser. No. 09/072,828, entitled "Integrated Wireless And Wireline Telecommunication Switch," discloses an integrated wireline and wireless switching system. The integrated wireline and wireless switching system disclosed includes hardware and software for implementing both wireless and wireline telecommunication switching functions. The software includes a wireless module and a wireline module, both of which communicate with a shared telecommunication module and an operating system. By invoking one or more shared procedures, whose addresses are stored in an aspect table, the wireless and wireline modules establish, maintain, and terminate calls between wireline and wireless subscribers without creating direct dependencies between the wireline and wireless modules.

The disclosed integrated wireline and wireless switching system, however, does not extend the enhanced services presently available in wireline switching systems to wireless subscribers and vice versa, without creating direct dependencies between the wireline and wireless modules. These enhanced services may include, for example, group dialing plans, message waiting indicator activation, call forwarding, simultaneous ringing, call conferencing, calling line identification, automatic call back, automatic recall, and speed dialing services. Thus, it is desirable to have a method and system for providing enhanced services to wireline and wireless subscribers in a switching system, which does not have the above and other disadvantages of the prior art.

SUMMARY OF THE INVENTION

Methods and systems consistent with the present invention perform enhanced services for wireline and wireless subscribers in an integrated wireline and wireless switching system. The enhanced services may include, for example, group dialing plans, message waiting indicator activation, call forwarding, simultaneous ringing, call conferencing, calling line identification, automatic call back, automatic recall, speed dialing services, and/or any other services that a switching system may provide to wireless and/or wireline subscribers.

When a calling wireline and/or wireless subscriber requests one or more of the enhanced services, the integrated wireline and wireless switching system determines the line types associated with the wireline and/or wireless devices of a called subscriber, and identifies references to one or more shared procedures for performing the enhanced services according to the determined line types Without creating direct dependencies between wireline and wireless modules in the integrated wireline and wireless switching system. Finally, the integrated wireline and wireless switching system executes the identified procedures to perform the shared services.

In one embodiment, the integrated wireline and wireless switching system comprises a shared operating system, a shared telecommunications module, a wireline module, a wireless module, and a shared libraries accessed by the wireline and the wireless modules. The shared libraries include structures, such as an aspect table, a dialing plans table, and a speed dialing table. The aspect table includes one or more references to a set of shared procedures for performing one or more enhanced services. The references are arranged such that the wireline and wireless modules execute the shared procedures without creating direct dependencies between the wireline and wireless modules.

The dialing plans table includes routing and translation information, which the wireline and wireless modules access for establishing calls between wireline and wireless subscribers in, for example, a business group. The speed dialing tables include abbreviated codes for dialing directory numbers (DNs) and mobile identification numbers (MINs) associated with wireline and wireless subscribers, respectively.

This summary and the following description of the invention should not restrict the scope of the claimed invention. Both provide examples and explanations to enable others to practice the invention. The accompanying drawings, which form part of the description of the invention, show several embodiments of the invention, and together with the description, explain the principles of the invention.

DETAILED DESCRIPTION OF THE INVENTION

The following description refers to the accompanying drawings. Where appropriate, the same reference numbers in different drawings refer to the same or similar elements.

Figure 1:
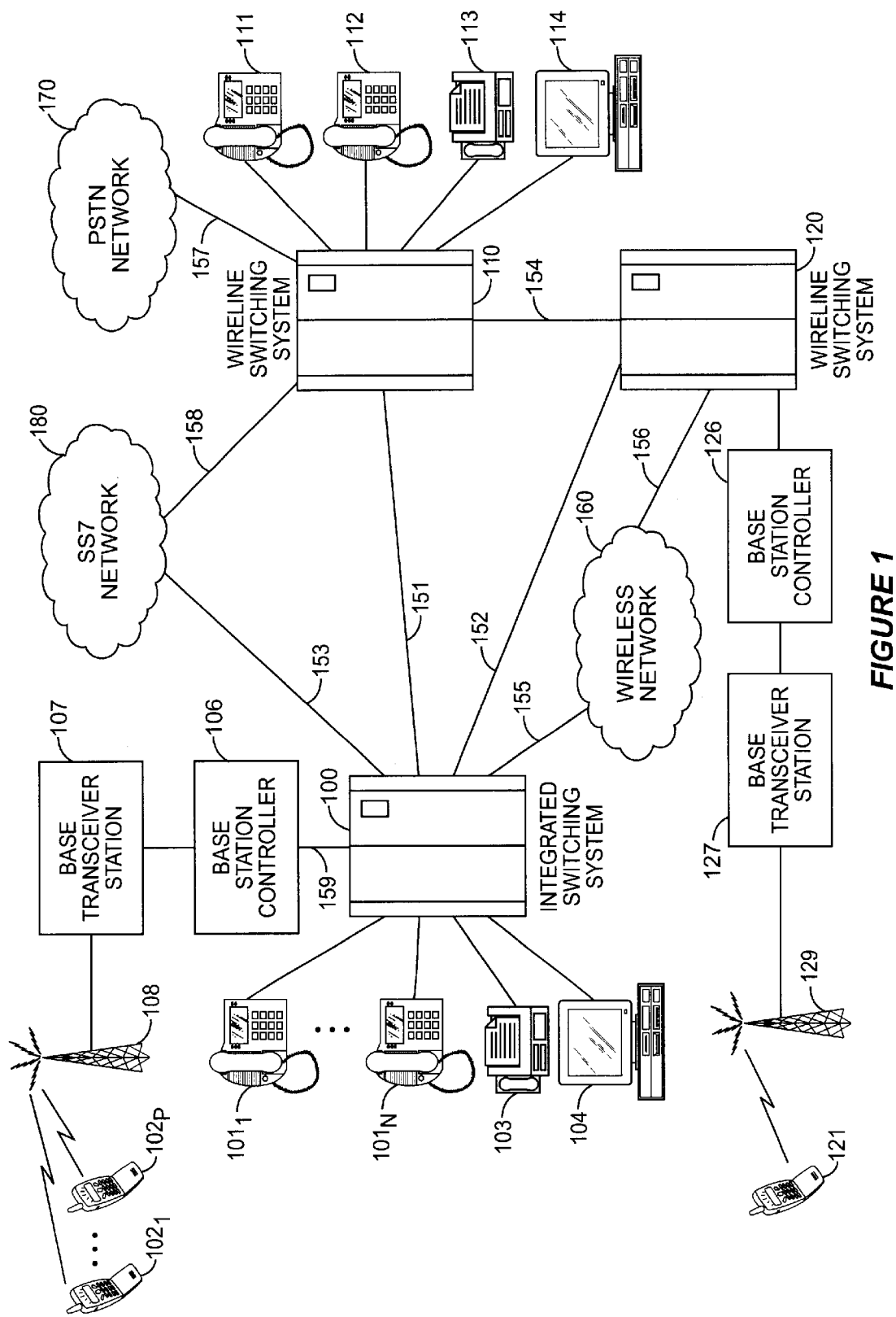
FIG. 1 is a block diagram of a communications network, which includes an integrated switching system, in accordance with an embodiment of the invention.

FIG. 1 is a block diagram of a communications network, which includes an integrated switching system 100, in accordance with an embodiment of the invention. Integrated switching system 100 connects via links 151 and 152 to wireline switching system 110 and wireless switching system 120, respectively, and connects via signaling link 153 to Signaling System 7 (SS7) network 180. Integrated switching system 100 connects via a plurality of loop lines to subscriber devices, which for example, include wireline telephones $101_1$–$101_N$, facsimile machine 103, and desktop computer 104, where N is an integer greater than zero.

Integrated switching system 100 also connects via a wireless interface to handsets $102_1$ through $102_P$, where P is an integer greater than zero. Each handset $102_1$–$102_P$ may, for example, be a standard personal communication system (PCS) handset, which communicates with integrated switching system 100.

The wireless interface includes Base Station Controller (BSC)106 and Base Transceiver Station (BTS) 107. BSC 106 generally performs data routing and voice coding functions. BSC 106 may be implemented as a separate hardware platform (as shown) or may be implemented as part of wireless switching system 120.

BTS 107 transmits and receives via antenna tower 108 signals from handsets $102_1$–$102_P$. Integrated switching system 100 also interfaces via link 155 with wireless network 160 using a wireless networking protocol, for example Global System For Mobile Communications (GSM-MAP) and/or "Interim Standard 41" (IS-41) wireless communication protocols.

Wireline switching system 110 connects via link 157 and signaling link 158 to a Public Switched Telephone Network (PSTN) 170 and SS7 network 180, respectively. Wireline switching system 110 connects via loop lines to subscriber devices, which, for example, include wireline telephones 111 and 112, facsimile machine 113, and desktop computer 114. Wireline switching system 110 connects via link 154 to wireless switching system 120.

Wireless switching system 120 interfaces with Base Station Controller (BSC)126, which provides data routing and voice coding. BSC 126 connects to Base Transceiver Station (BTS) 127, which transmits and receives via antenna tower 129 signals from handset 121. Handset 121 may, for example, be a standard PCS handset, which communicates with wireless switching system 120. Wireless switching system 120 also interfaces via link 156 with wireless network 160 using a wireless networking protocol, for example GSM-MAP and/or IS41 wireless communication protocols.

Figure 2:
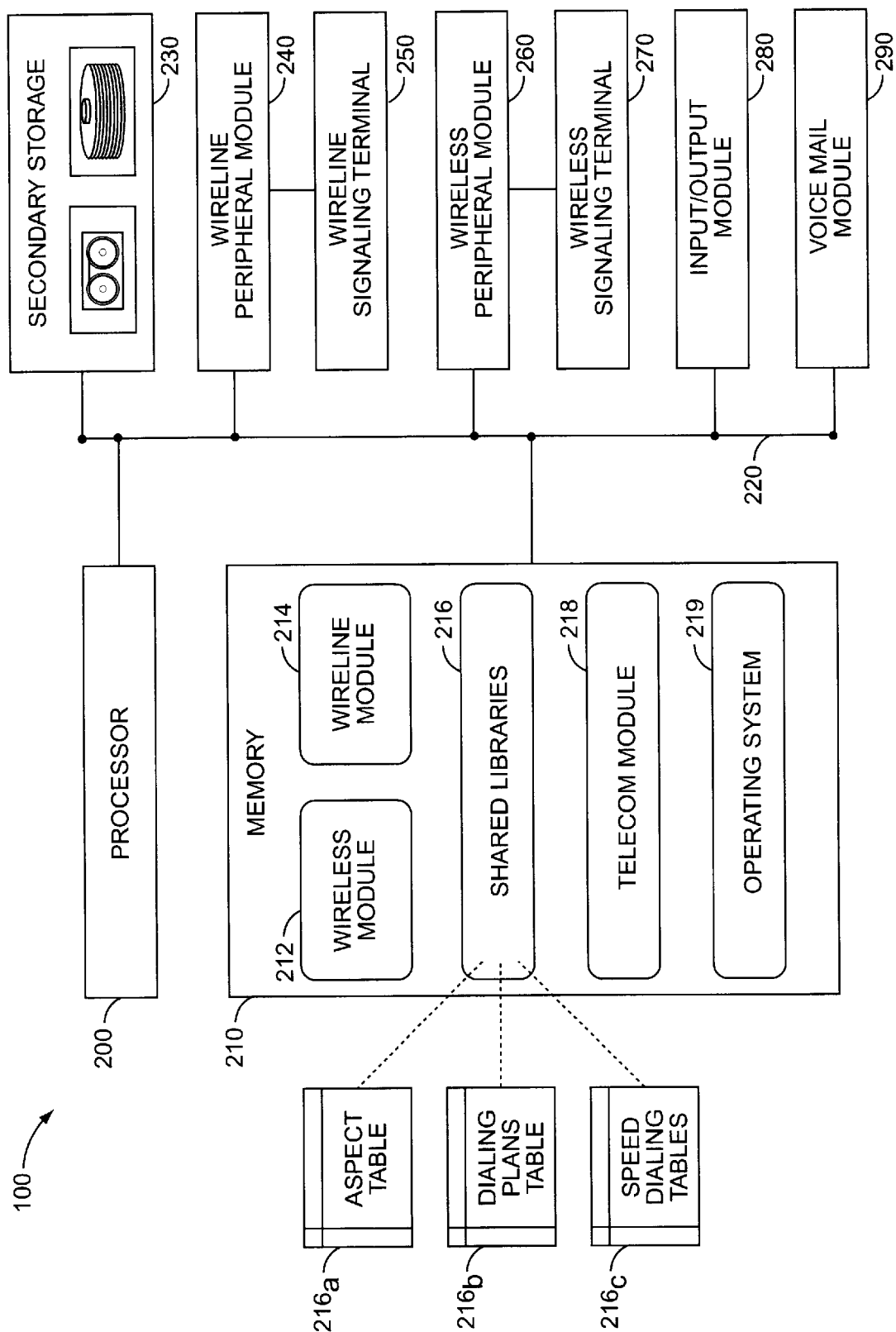
FIG. 2 is a block diagram of an integrated switching system, in accordance with an embodiment of the invention.

FIG. 2 is an internal block diagram of integrated switching system 100, in accordance with an embodiment of the invention. As shown, integrated switching system 100 includes a processor 200, which connects via a bus 220 to a memory 210, a secondary storage 230, a wireline peripheral module 240, a wireless peripheral module 260, an input/output module 280, and a voice mail module 290.

Memory 210 includes a wireless module 212, a wireline module 214, shared libraries 216, a telecommunication module 218, and an operating system 219. Wireline module 214 and wireless module 212 invoke shared procedures and data, which are stored in shared libraries 216, telecommunication module 218, and operating system 219, for establishing, maintaining, and terminating calls between wireline and wireless subscribers using, for example, the methods and systems disclosed in U.S. application Ser. No. 09/072,828, entitled "Integrated Wireless And Wireline Telecommunication Switch," the contents of which are incorporated herein in their entirety by reference.

Shared libraries 216 include structures, such as an Aspect Table 216a, a Dialing Plans Table 216b, and Speed Dialing Tables 216c. Alternatively, Aspect Table 216a, Dialing Plans Table 216b, and Speed Dialing Tables 216c may reside in, for example, telecommunication module 218.

As described below in detail, wireline module 214 and wireless module 212 invoke a set of shared procedures, whose references are stored in Aspect Table 216a, to establish, maintain, and terminate calls between wireline and wireless subscribers that are members of a group, activate message waiting indicators in a plurality of wireline and wireless devices that are associated with a subscriber, and to provide shared services to wireline and wireless subscribers, without creating any direct dependencies between wireline module 214 and wireless module 212. The references may include the addresses in memory 210 where the shared procedures reside. For example, the shared procedures may be bounded into Aspect Table 216a. Alternatively, the references may include pointers to other structures in memory 210 that include the addresses in memory 210 where the shared procedures reside.

Telecommunication module 218 includes software and data for performing standard switching functions, which include, for example, call processing scheduling, maintenance functions, and billing functions. Operating system 219 includes software and data for non-switching functions, which include, for example, task scheduling and processor interrupt handling.

Secondary storage 230 includes a computer readable medium such as a disk drive and a tape drive. From the tape drive, software and data may be loaded onto the disk drive, which can then be copied into memory unit 210. Similarly, software and data in memory unit 210 may be copied onto the disk drive, which can then be loaded onto the tape drive.

Wireline peripheral module 240 sends messages to and receives messages from wireline switching system 110 via link 151. Wireline peripheral module 240 includes, for example, digital trunk controllers, line concentrating devices, line group controllers, line trunk controllers, and data networking interface devices. An extended peripheral module (XPM) (not shown) may control the operation of wireline peripheral module 240. In addition, wireline peripheral module 240 connects to wireline signaling terminal 250, which sends signaling messages to and receives signaling messages from SS7 network 180 via signaling link 153.

Wireless peripheral module 260 sends messages to and receives messages from BSC 106, wireless switching system 120, and wireless network 160 via links 159, 152, and 155, respectively. Furthermore, wireless peripheral module 260 connects to wireless signaling terminal 270, which sends signaling messages to and receives signaling messages from BSC 106, wireless switching system 120, and wireless network 160 via links 159, 152, and 155, respectively.

Input/Output module 280 may include, for example, a workstation (not shown).

Figure 3:
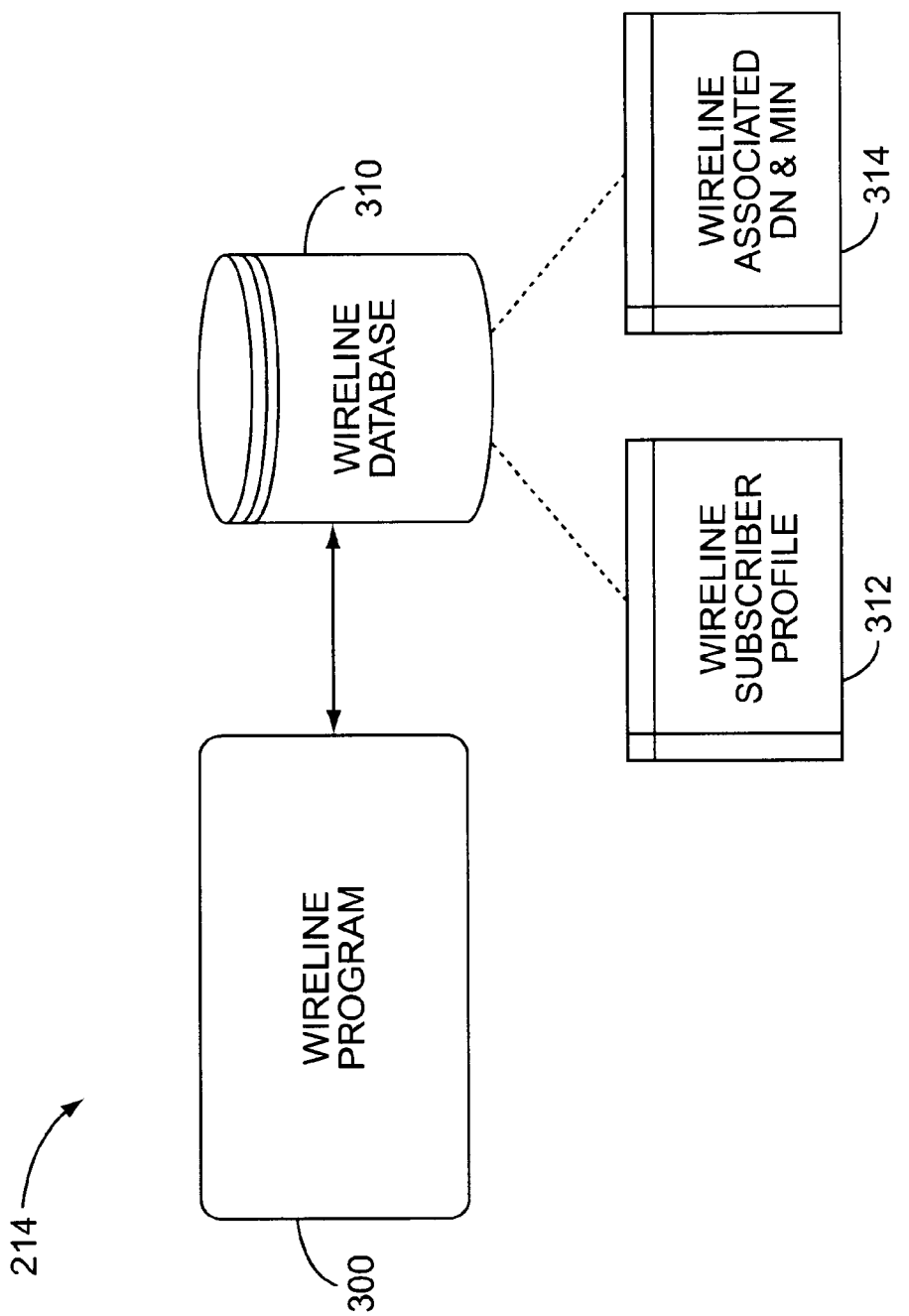
FIG. 3 is a block diagram of a wireline module in an integrated switching system, in accordance with an embodiment of the invention.

FIG. 3 is a block diagram of wireline module 214 in integrated switching system 100, in accordance with an embodiment of the invention. As shown, wireline module 214 includes a wireline program 300 and a wireline database 310. Wireline program 300 includes, for example, stored instructions in the form of software, which are executed by processor 200. Wireline database 310 includes a Wireline Subscriber Profile Table 312 and a Wireline Associated DN/MIN Table 314.

Each entry in Wireline Subscriber Profile Table 312 is associated with a particular wireline subscriber in integrated switching system 100. The entry may include, for example, a subscriber identifier, a group identifier, a service class, an incoming call memory, an outgoing call memory, and a list of services, which are subscribed to by the particular wireline subscriber. A subscriber identifier identifies the particular wireline subscriber, and may include, for example, a Directory Number (DN).

A group identifier may identify, for example, a particular business group to which the wireline subscriber belongs. Wireline subscribers in a group may dial abbreviated DNs and/or Mobile Identification Numbers (MINs) whenever calling other wireline and wireless subscribers in the group. The length of the extensions may range from, for example, 1 to 6 digits, depending on the number of wireline and wireless subscribers in the group. Wireline subscribers in the group may dial outside access codes, for example 9+DN or 9+MIN, to access DNs and/or MINs outside of the group.

A service class defines a category of services that can be provided to the wireline subscriber's device. Wireline module 214 may use the service class to limit the type of calls initiated by the wireline subscriber or a group of wireline subscribers to, for example, off network calls, toll calls, or international calls.

An incoming call memory identifies the characteristics, for example DN and/or MIN, of the last calling wireline and/or wireless subscriber, which called the particular wireline subscriber. An outgoing call memory identifies the characteristics, for example DN and/or MIN, of the last called wireline and/or wireless subscriber, which the particular wireline subscriber called.

The list of services may include, for example, call forwarding, call conferencing, simultaneous ringing, calling line identification, automatic call back, automatic recall, and speed dialing, all of which are described below in detail. Alternatively, the list of services may include any other services that a switching system may provide to wireline subscribers.

Each entry in Wireline Associated DN/MIN Table 314 associates a DN to one or more DNs and/or MINs.

Figure 4:
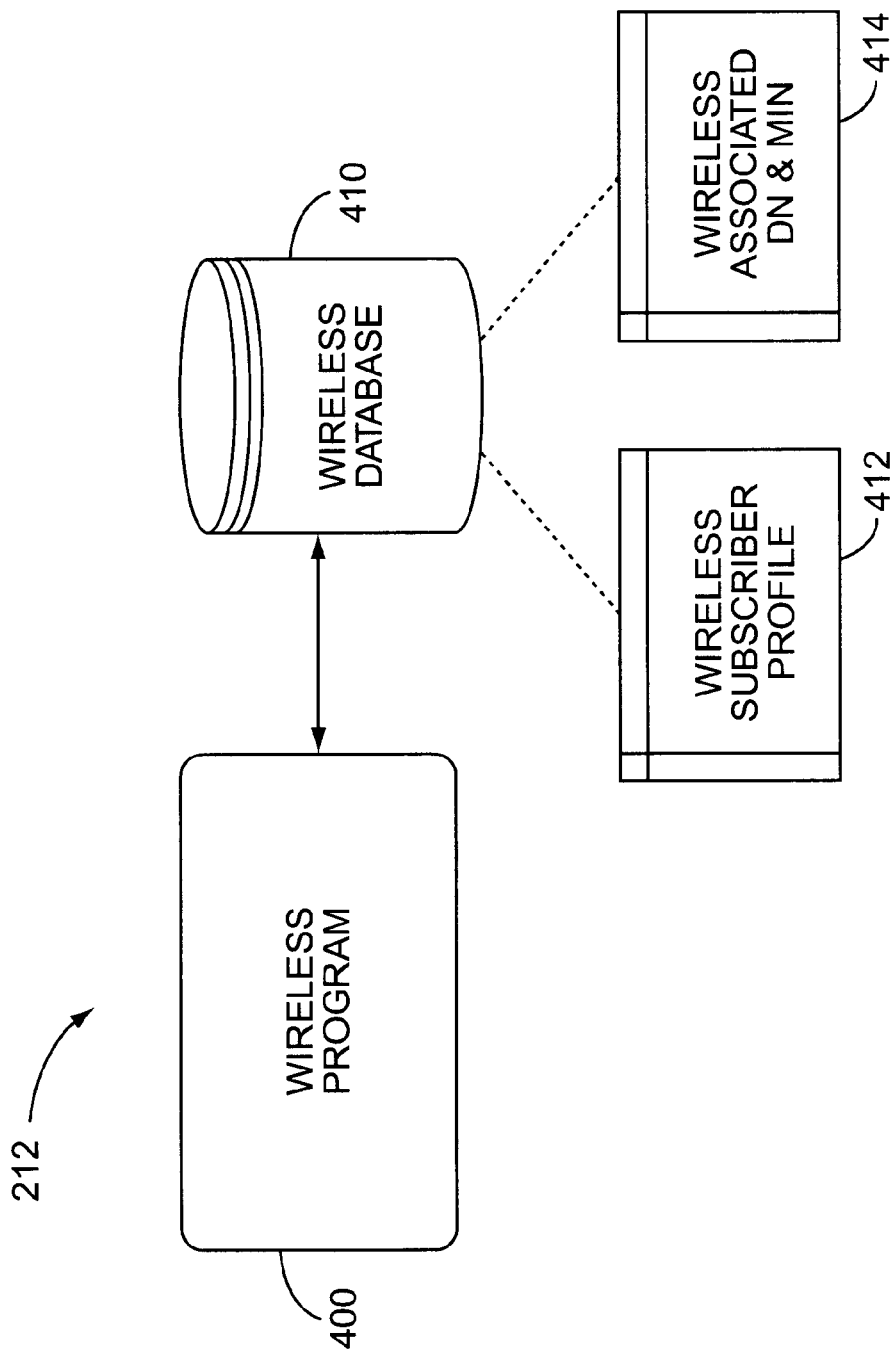
FIG. 4 is a block diagram of a wireless module in an integrated switching system, in accordance with an embodiment of the invention.

FIG. 4 is a block diagram of wireless module 212 in integrated switching system 100, in accordance with an embodiment of the invention. As shown, wireless module 212 includes a wireless program 400 and a wireless database 410. Wireless program 400 includes, for example, stored instructions in form of software, which are executed by processor 200. Wireless database 410 includes a Wireless Subscriber Profile Table 412 and a Wireless Associated DN/MIN Table 414.

Each entry in Wireless Subscriber Profile Table 412 is associated with a particular wireless subscriber in integrated switching system 100. The entry may include, for example, a subscriber identifier, a group name, a service class, an incoming call memory, an outgoing call memory, and a list of services, which are subscribed to by the particular wireless subscriber. A subscriber identifier identifies the particular wireless subscriber, and may include, for example, an MIN.

A group identifier may identify, for example, a particular business group to which the wireless subscriber belongs. Wireless subscribers in a group may dial abbreviated DNs and/or MINs whenever calling other wireline and wireless subscribers in the group. The length of the extensions may range from, for example, 1 to 6 digits, depending on the number of wireline and wireless subscribers in the group. Wireless subscribers in the group may dial outside access codes, for example 9+DN or 9+MIN, to access DNs and/or MINs outside of the group.

A service class defines a category of services that can be provided to the wireless subscriber's device. Wireless module 212 may use the service class to limit the type of calls initiated by the wireless subscriber or a group of wireless subscribers to, for example, off network calls, toll calls, or international calls.

An incoming call memory identifies the characteristics, for example DN and/or MIN, of the last calling wireline and/or wireless subscriber, which called the particular wireless subscriber. An outgoing call memory identifies the characteristics, for example DN and/or MIN, of the last called wireline and/or wireless subscriber, which the particular wireless subscriber called.

The list of services may include, for example, call forwarding, call conferencing, simultaneous ringing, calling line identification, automatic call back, and automatic recall, all of which are described below in detail. Alternatively, the list of services may include any other services that a switching system may provide to wireless subscribers Each entry in Wireless Associated DN/MIN Table 414 associates an MIN to one or more DNs and/or MINs.

Figure 5:
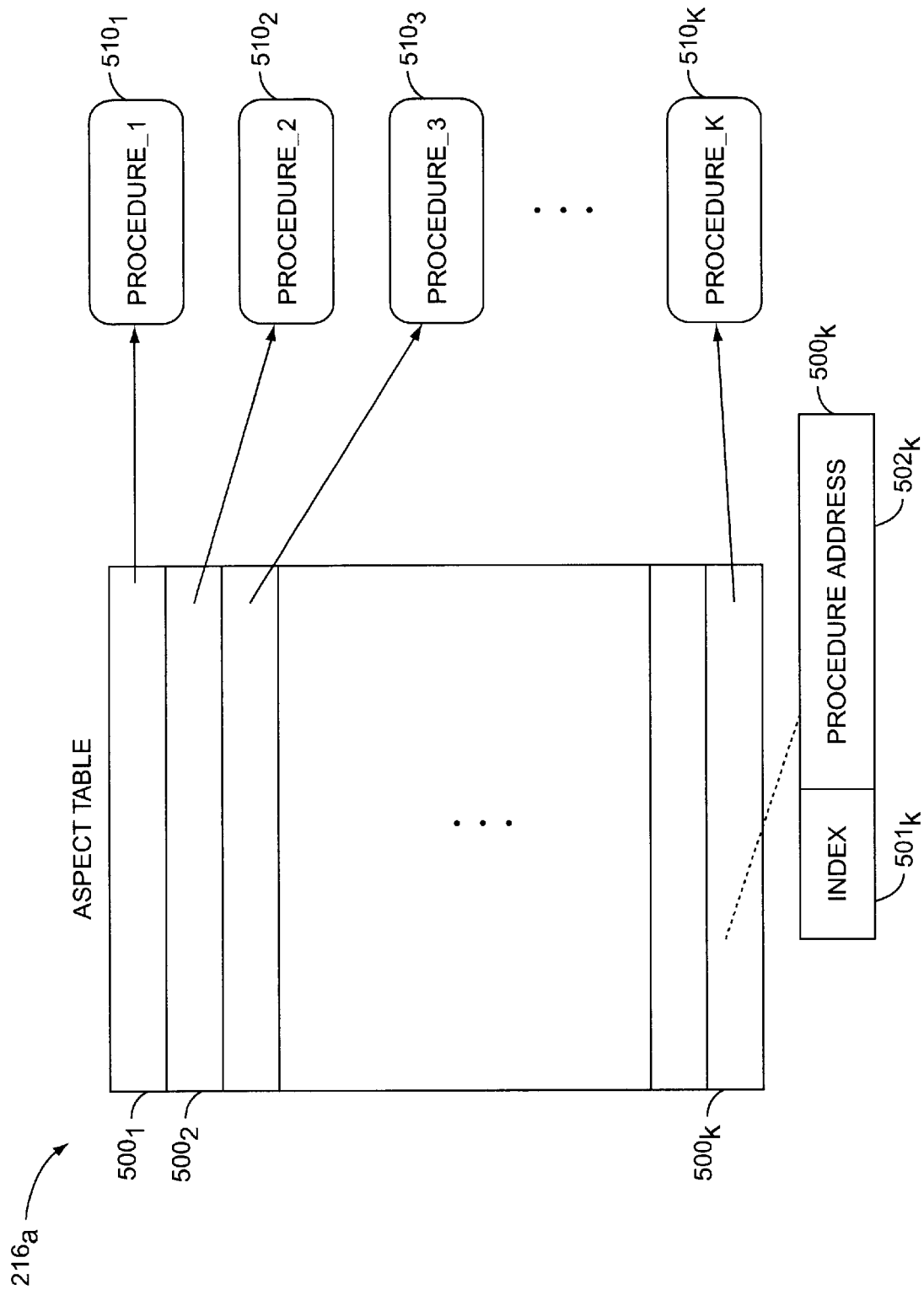
FIG. 5 is a block diagram of an aspect table in an integrated switching system, in accordance with an embodiment of the invention.

FIG. 5 is a block diagram of Aspect Table 216a in memory 210, in accordance with an embodiment of the invention. Aspect Table 216a includes k entries $500_1$–$500_k$, where k is an integer greater than zero. Each entry $500_1$–$500_k$ includes an index field and a procedure address field. The index field may include, for example, an identifier that identifies a particular line type on which a call is initiated and/or terminated. The line type may be, for example, a Plain Ordinary Telephone Service (POTS) and/or Basic Rate Integrated Services Digital Network (ISDN).

The procedure address field may include, for example, an address of a procedure for performing one or more steps in processing that call in integrated switching system 100. For example, as shown, entry $500_k$ includes index $501_k$ and procedure address $502_k$. Procedure address $502_k$ includes the address of procedure_k $510_k$ in memory 210.

Figure 6:
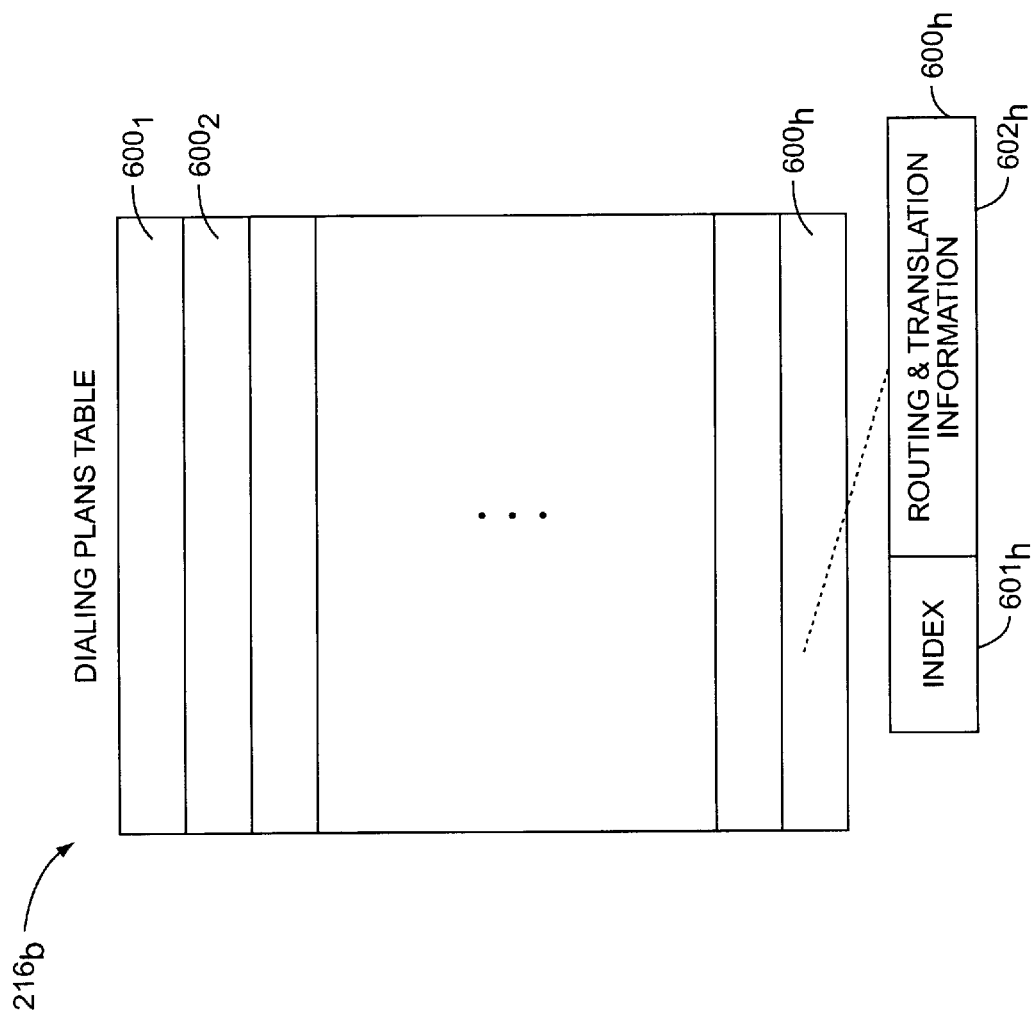
FIG. 6 is a block diagram of a dialing plans table in an integrated switching system, in accordance with an embodiment of the invention.

FIG. 6 is a block diagram of Dialing Plans Table 216b in memory 210, in accordance with an embodiment of the invention. Dialing Plans Table 216b includes h entries $600_1$–$600_h$, where h is an integer greater than zero. Each entry $600_1$–$600_h$ includes an index field and a routing and translation field. The index field may include, for example, an identifier that identifies a particular business group and a calling subscriber. The routing and translation field may include information for processing a call between wireline and wireless subscribers, which are in, for example, a business group. For example, as shown, entry $600_h$ includes index $601_h$ and routing and translation information $602_h$.

Figure 7:
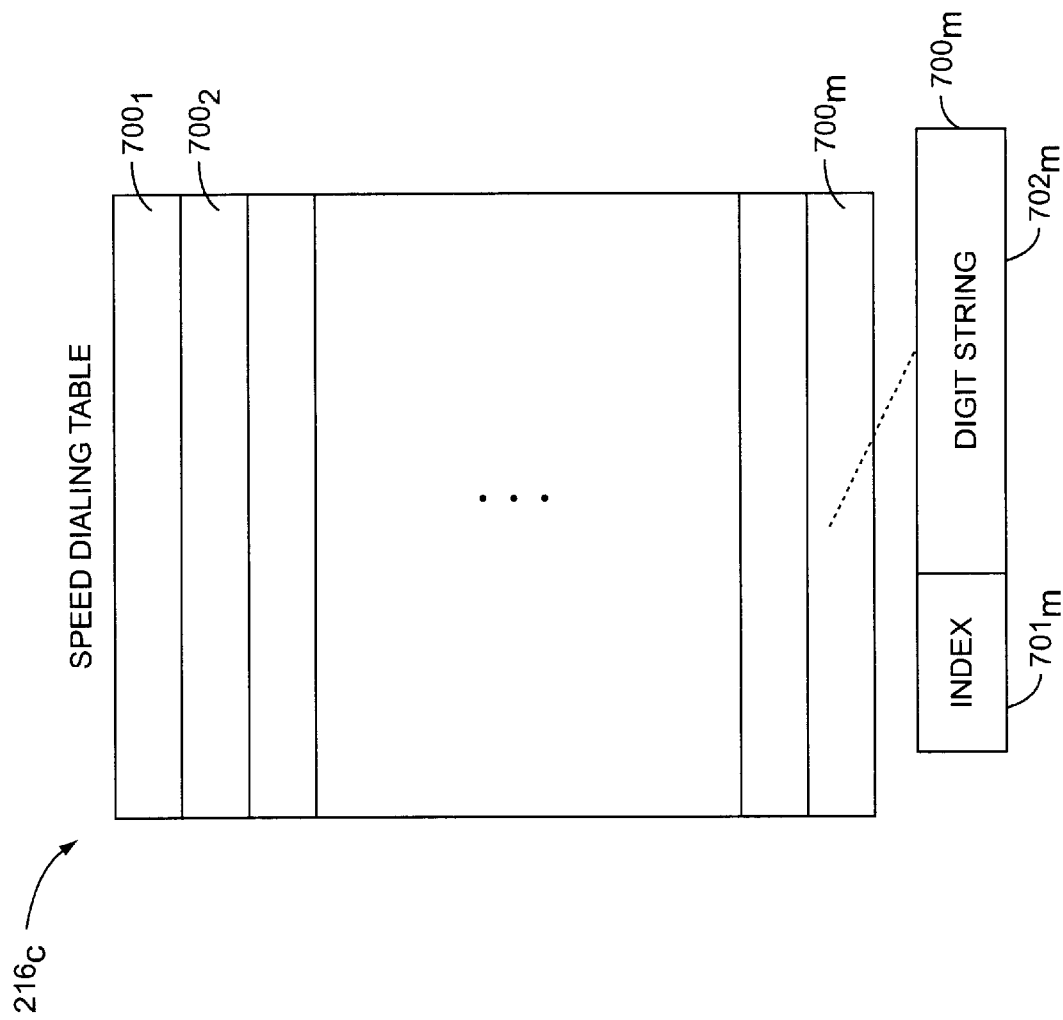
FIG. 7 is a block diagram of a speed dialing table in an integrated switching system, in accordance with an embodiment of the invention.

FIG. 7 is a block diagram of a Speed Dialing Table 216c in memory 210, in accordance with an embodiment of the invention. Speed Dialing Table 216c includes m entries $700_1$–$700_m$, where m is an integer greater than zero. Each entry $700_1$–$700_m$ includes an index field and a digit string field. The index field may include, for example, an abbreviated DN and/or MIN, and the digit string field may include a string of digits associated with a speed call cell, for example a DN and/or MIN dialed by a subscriber. For example, as shown, entry $700_m$ includes index $701_m$ and digit string field $702_m$.

Figure 8:
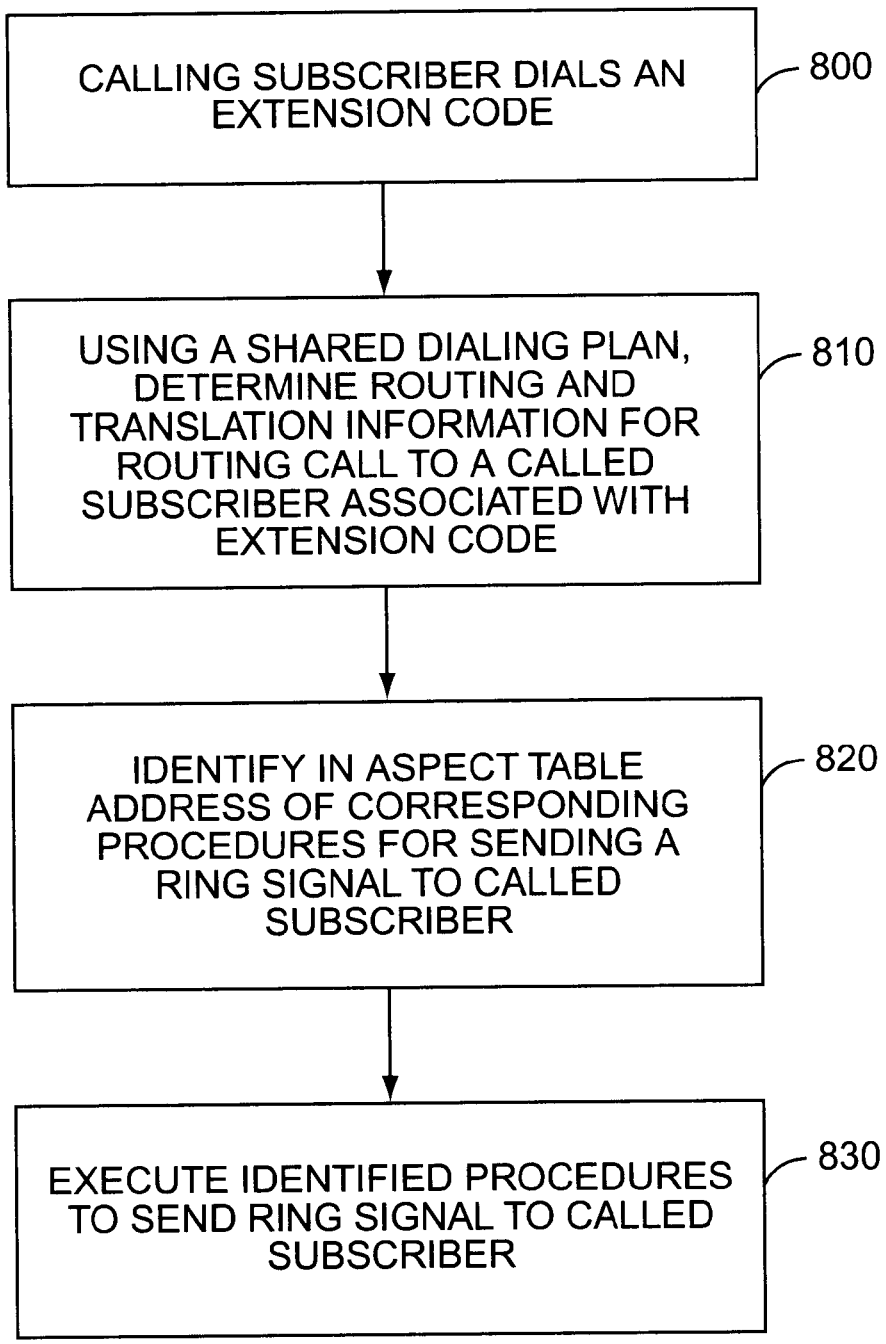
FIG. 8 is a flow chart of the steps performed by a wireline and/or wireless program in an integrated switching system for establishing calls between members of a group, in accordance with an embodiment of the invention.

FIG. 8 is a flow chart of the steps performed by wireline program 300 and/or wireless program 400 in integrated switching system 100 for establishing a call between wireline and wireless subscribers in a group, for example between wireline telephone $101_1$ and wireless handset $102_1$, in accordance with an embodiment of the invention. In one embodiment, using wireline telephone $101_1$, a calling subscriber dials an extension code, which may include, for example, an abbreviated MIN associated with wireless handset $102_1$ (step 800).

From Dialing Plans Table 216a, wireline program 300 determines routing and translation information for routing the call to wireless handset $102_1$ (step 810). For example, wireline program 300 retrieves from Wireline Subscriber Table 312 the group identifier and service class associated with the calling subscriber. Based on the retrieved group identifier and service class, wireline program 300 builds an index into Dialing Plans Table 216a. Using the index, wireline program 300 retrieves from Dialing Plans Table 216b the routing and translation information for routing the call to wireless handset $102_1$.

Wireline program 300 then retrieves from Aspect Table 216a the address of the corresponding procedures for sending a ring signal to wireless handset $102_1$ (step 820). For example, wireline program 300 determines the line type associated with wireless handset $102_1$, and using the determined line type as an index into Aspect Table 216a, retrieves the address of the corresponding procedure in memory 210 for sending a ring signal to wireless handset $102_1$. Finally, wireline program 300 executes the identified procedure to send the ring signal (step 830).

In another embodiment, using wireless telephone $102_1$, a calling subscriber dials an extension code, which may include, for example, an abbreviated DN associated with wireline telephone $101_1$ (step 800). From Dialing Plans Table 216a, wireless program 400 determines routing and translation information for routing the call to wireline telephone $101_1$ (step 810). For example, wireless program 400 retrieves from Wireless Subscriber Table 412 the group identifier and service class associated with the calling subscriber. Based on the retrieved group identifier and service class, wireless program 400 builds an index into Dialing Plans Table 216a. Using the index, wireless program 400 retrieves from Dialing Plans Table 216b the routing and translation information for routing the call to wireline telephone $101_1$.

Wireless program 400 retrieves from Aspect Table 216a the address of the corresponding procedures for sending a ring signal to wireline telephone $101_1$ (step 820). For example, wireless program 400 determines the line type associated with wireline telephone $101_1$, and using the determined line type as an index into Aspect Table 216a, retrieves the address of the corresponding procedure in memory 210 for sending a ring signal to wireline telephone $101_1$. Finally, wireless program 400 executes the identified procedure to send the ring signal (step 830).

Figure 9:
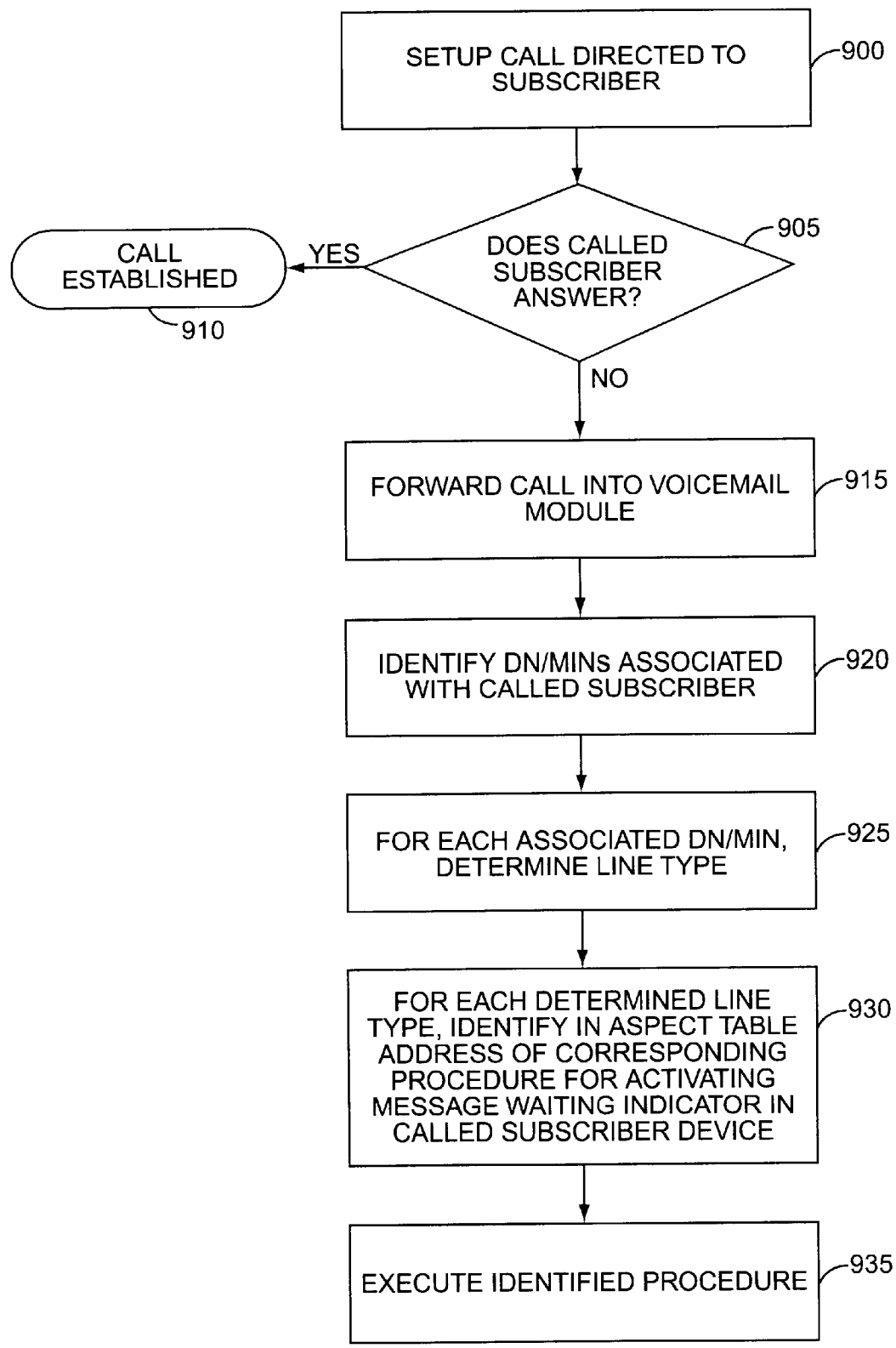
FIG. 9 is a flow chart of the steps performed by a wireline and/or wireless program in an integrated switching system for activating message waiting indicators in a plurality of wireline and wireless devices associated with a subscriber, in accordance with an embodiment of the invention.

FIG. 9 is a flow chart of the steps performed by wireline program 300 and/or wireless program 400 for activating a message waiting indicator in a called subscriber wireline and wireless devices, in accordance with an embodiment of the invention. In one embodiment, wireline program 300 sets up a call to a called subscriber device, for example wireline telephone $101_1$ (step 900). Wireline program 300 determines whether the called subscriber answers (step 905). If the called subscriber answers, wireline program 300 determines that the call to the called subscriber is established (step 910).

If the called subscriber does not answer the call, wireline program 300 forwards the call into voice mail module 290 (shown in FIG. 2)(step 915). Wireline program 300 then identifies any other DNs and/or MINs, which are also associated with the called subscriber, for example those associated with wireline telephone $101_2$ and wireless handset $102_1$, by using the called subscriber DN as an index into Wireline Associated DN/MIN Table 314 (step 920).

For each identified DN and/or MIN, wireline program 300 determines the line type associated with the DN and/or MIN (step 925). For each determined line type, wireline program 300 retrieves from Aspect Table 216a the address of the corresponding procedure in memory 210 for activating the message waiting indicator in the corresponding called subscriber devices (step 930). For example, wireline program 300 determines the line types associated with wireline telephones $101_1$ and $101_2$, and using the determined line types as indexes into Aspect Table 216a, retrieves the addresses of the corresponding procedures in memory 210 for activating the message waiting indicators in wireline telephones $101_1$ and $101_2$. Similarly, wireline program 300 determines the line type associated with wireless handset $102_1$, and using the determined line type as an index into Aspect Table 216a, retrieves the address of the corresponding procedure in memory 210 for activating the message waiting indicator in wireless handset $102_1$. Finally, wireline program 300 executes the identified procedures to activate the message waiting indicators in wireline telephones $101_1$ and $101_2$ and wireless handset $102_1$ (step 935).

Figure 10:
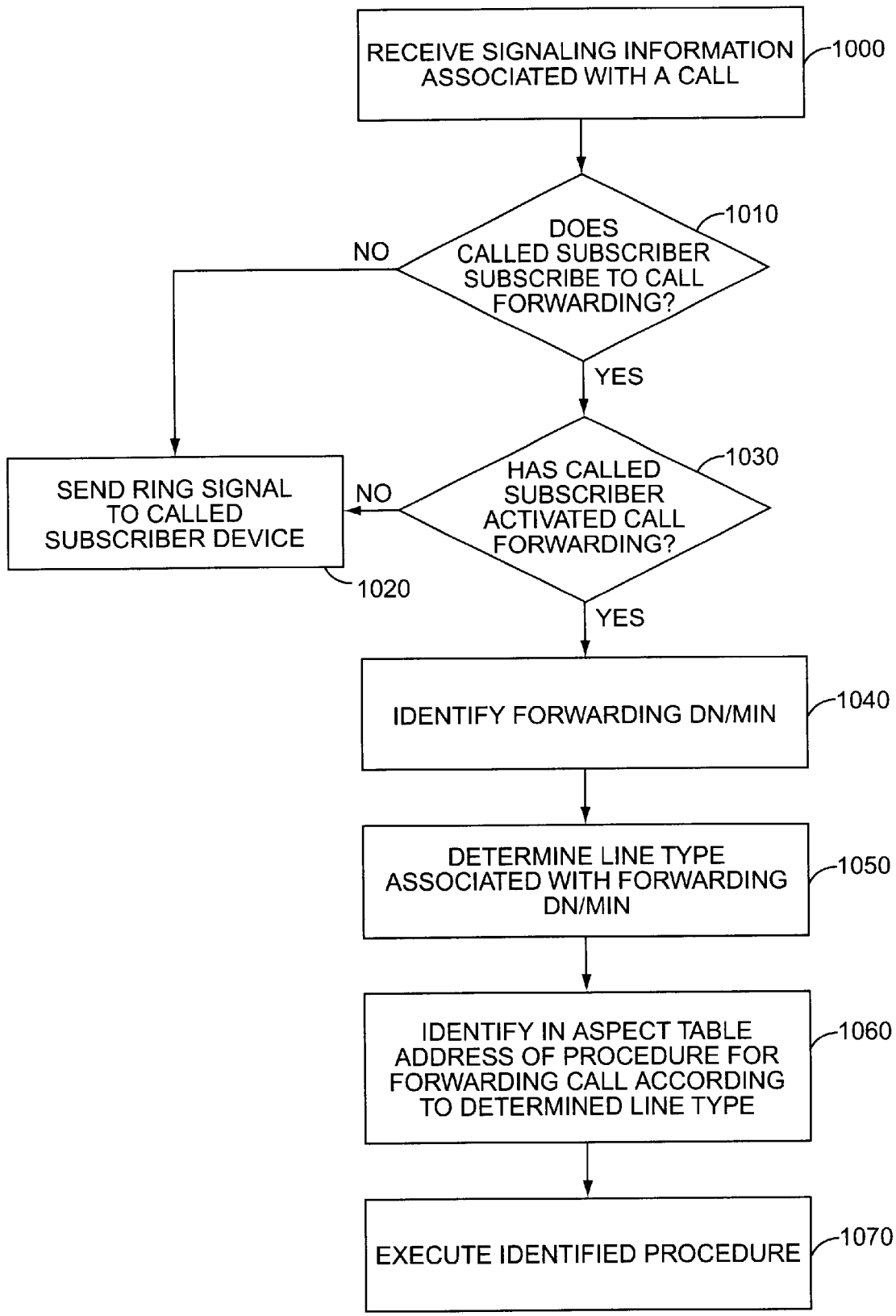
FIG. 10 is a flow chart of the steps performed by a wireline and/or wireless program in an integrated switching system for forwarding a call to a wireline and/or wireless subscriber, in accordance with an embodiment of the invention.

FIG. 10 is a flow chart of the steps performed by wireline program 300 and/or wireless program 400 for forwarding a call, in accordance with an embodiment of the invention. In one embodiment, wireline program 300 receives via wireline signaling terminal 250 signaling information associated with a call, which is initiated by a calling subscriber, for example wireline telephone $101_1$ (step 1000). Wireline program 300 determines whether the called subscriber, for example wireline telephone $101_2$, subscribes to call forwarding service by retrieving the subscriber profile associated with the called subscriber from Wireline Subscriber Profile Table 312 (step 1010).

If wireline program 300 determines that the called subscriber does not subscribe to call forwarding service, wireline program 300 sends a ring signal to wireline telephone $101_2$ (step 1020). If wireline program 300 determines that the called subscriber subscribes to call forwarding service, wireline program 300 determines whether the called subscriber has activated call forwarding (step 1030).

If wireline program 300 determines that the called subscriber has not activated call forwarding, wireline program 300 sends a ring signal to wireline telephone $101_2$ (step 1020). If wireline program 300 determines that the called subscriber has activated call forwarding, wireline program 300 identifies the DN and/or MIN to which the call must be forwarded, for example the MIN associated with wireless handset $102_1$ (step 1040).

Wireline program 300 determines the line type associated with wireless handset $102_1$ (step 1050). Based on the determined line type, wireline program 300 retrieves from Aspect Table 216a the address of the corresponding procedure in memory 210 for forwarding the call to wireless handset $102_1$ (step 1060). Finally, wireline program 300 executes the identified procedure to forward the call (step 1070).

In another embodiment, wireless program 400 receives via wireless signaling terminal 270 signaling information associated with a call, which is initiated by a calling subscriber, for example wireless handset $102_1$ (step 1000). Wireless program 400 determines whether the called subscriber, for example wireless handset $102_2$, subscribes to call forwarding service by retrieving the subscriber profile associated with the called subscriber from Wireless Subscriber Profile Table 412 (step 1010).

If wireless program 400 determines that the called subscriber does not subscribe to call forwarding service, wireless program 400 sends a ring signal to wireless handset $102_2$ (step 1020). If wireless program 400 determines that the called subscriber subscribes to call forwarding service, wireless program 400 determines whether the called subscriber has activated call forwarding (step 1030).

If wireless program 400 determines that the called subscriber has not activated call forwarding, wireless program 400 sends a ring signal to wireless handset $102_2$ (step 1020). If wireless program 400 determines that the called subscriber has activated call forwarding, wireless program 400 identifies the DN and/or MIN to which the call must be forwarded, for example the DN associated with wireline telephone $101_1$ (step 1040).

Wireless program 400 then determines the line type associated with wireline telephone $101_1$ (step 1050). Based on the determined line type, wireless program 400 retrieves from Aspect Table 216a the address of the corresponding procedure in memory 210 for forwarding the call to wireline telephone $101_1$ (step 1060). Finally, wireless program 400 executes the identified procedure to forward the call (step 1070).

Figure 11:
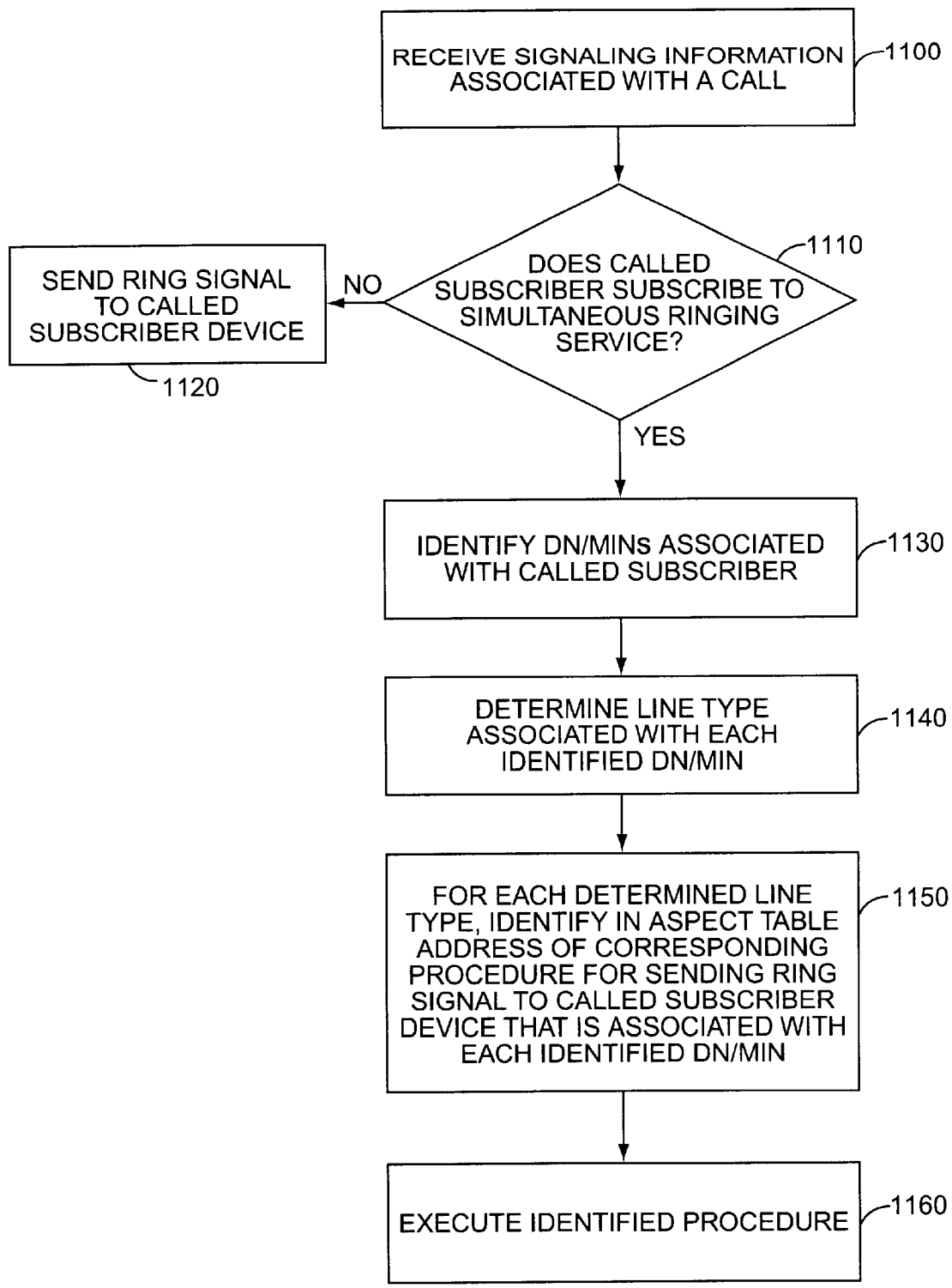
FIG. 11 is a flow chart of the steps performed by a wireline and/or wireless program in an integrated switching system for simultaneously ringing a plurality of wireline and wireless devices associated with a subscriber, in accordance with an embodiment of the invention.

FIG. 11 is a flow chart of the steps performed by wireline program 300 and/or wireless program 400 for simultaneously ringing a plurality of wireless and wireline devices associated with a called subscriber, for example wireline telephone $101_1$ and wireless handset $102_1$, in accordance with an embodiment of the invention. In one embodiment, wireline program 300 receives via wireline signaling terminal 250 signaling information associated with a call, which is initiated by a wireline subscriber, for example wireline telephone $101_2$ (step 1100). Wireline program 300 determines whether the called subscriber, for example wireline telephone $101_1$, subscribes to simultaneous ring service by retrieving the profile associated with the called subscriber from Wireline Subscriber Profile Table 312 (step 1110).

If wireline program 300 determines that the called subscriber does not subscribe to simultaneous ring service, wireline program 300 sends a ring signal to wireline telephone $101_1$ (step 1120). If wireline program 300 determines that the called subscriber subscribes to simultaneous ring service, wireline program 300 retrieves from Wireline Associated DN/MIN Table 314 the DNs and/or MINs, which are also associated with the called subscriber, for example wireless handset $102_1$ (step 1130).

Wireline program 300 determines the line type associated with each identified DN and MIN (step 1140). For each determined line type, wireline program 300 retrieves from Aspect Table 216a the address of the corresponding procedure in memory 210 for sending a ring signal to wireline telephone $101_1$ and wireless handset $102_1$ (step 1150). For example, wireline program 300 determines the line type associated with wireline telephone $101_1$, and using the determined line type as an index into Aspect Table 216a, retrieves the address of the corresponding procedure in memory 210 for sending a ring signal to wireline telephone $101_1$. Similarly, wireline program 300 determines the line type associated with wireless handset $102_1$, and using the determined line type as an index into Aspect Table 216a, retrieves the address of the corresponding procedure in memory 210 for sending a ring signal to wireless handset $102_1$. Finally, wireline program 300 executes the identified procedures to send the ring signals to wireline telephone $101_1$ and wireless handset $102_1$ (step 1160).

In another embodiment, wireless program 400 receives via wireline signaling terminal 270 signaling information associated with a call, which is initiated by a wireless subscriber, for example wireless handset $102_2$ (step 1100). Wireline program 300 determines whether the called subscriber, for example wireless handset $102_1$, subscribes to simultaneous ring service by retrieving the profile associated with the called subscriber from Wireless Subscriber Profile Table 412 (step 1110).

If wireless program 400 determines that the called subscriber does not subscribe to simultaneous ring service, wireless program 400 sends a ring signal to wireless handset $102_1$ (step 1120). If wireline program 300 determines that the called subscriber subscribes to simultaneous ring service, wireline program 300 retrieves from Wireless Associated DN/MIN Table 414 the DNs and/or MINs, which are also associated with the called subscriber, for example wireline telephone $101_1$ (step 1130).

Wireless program 400 determines the line type associated with each identified DN and MIN (step 1140). For each determined line type, wireless program 400 retrieves from Aspect Table 216a the address of the corresponding procedure in memory 210 for sending a ring signal to wireline telephone $101_1$ and wireless handset $102_1$ (step 1150). For example, wireless program 400 determines the line type associated with wireline telephone $101_1$, and using the determined line type as an index into Aspect Table 216a, retrieves the address of the corresponding procedure in memory 210 for sending a ring signal to wireline telephone $101_1$. Similarly, wireless program 400 determines the line type associated with wireless handset $102_1$, and using the determined line type as an index into Aspect Table 216a, retrieves the address of the corresponding procedure in memory 210 for sending a ring signal to wireless handset $102_1$. Finally, wireless program 400 executes the identified procedures to send the ring signals to wireline telephone $101_1$ and wireless handset $102_2$ (step 1160).

Figure 12:
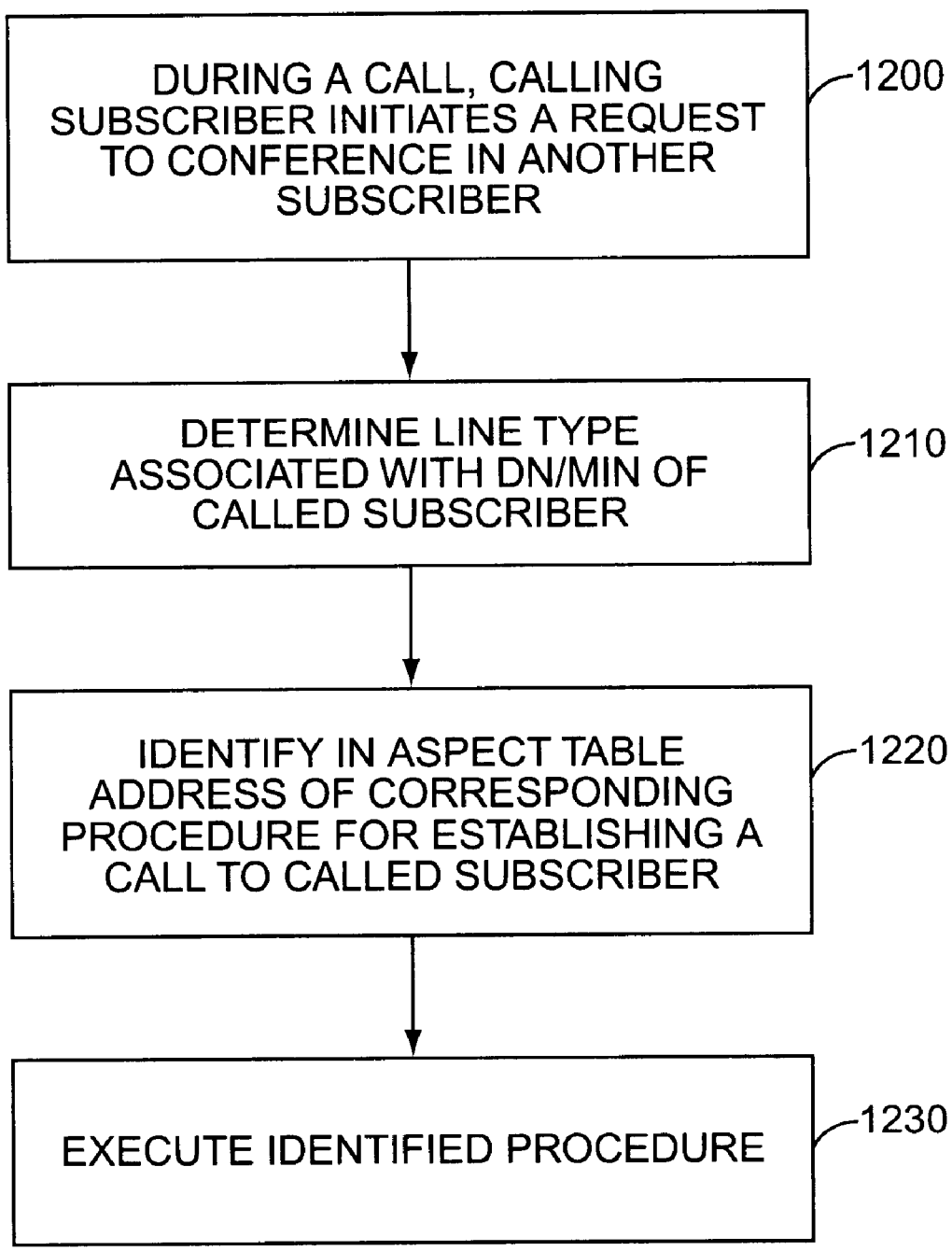
FIG. 12 is a flow chart of the steps performed by a wireline and/or wireless program in an integrated switching system for adding one or more wireline and/or wireless subscribers to a call, in accordance with an embodiment of the invention.

FIG. 12 is a flow chart of the steps performed by wireline program 300 and/or wireless program 400 for adding one or more wireline and/or wireless subscribers to a call, in accordance with an embodiment of the invention. In one embodiment, after a call is established between a calling subscriber, for example wireline telephone $101_1$, and a first called subscriber, wireline program 300 receives a request message from, for example, the calling subscriber to add to the call a second called subscriber, for example wireless handset $102_1$ (step 1200). Wireline program 300 then determines the line type associated with wireless handset $102_1$ (step 1210).

Wireline program 300 retrieves from Aspect Table 216a the address of the corresponding procedures for establishing a call between wireline telephone $101_1$ and wireless handset $102_1$ step 1220). For example, using the determined line type as an index into Aspect Table 216a, wireline program 300 retrieves the address of the corresponding procedure in memory 210 for establishing a call between wireline telephone $101_1$ and wireless handset $102_1$. Finally, wireline program 300 executes the identified procedure to establish the call (step 1230).

In another embodiment, after a call is established between a calling subscriber, for example wireless handset $102_1$, and a first called subscriber, wireless program 400 receives a request message from, for example, the calling subscriber to add to the call a second called subscriber, for example wireline telephone $101_1$ (step 1200). Wireless program 400 then determines the line type associated with wireline telephone $101_1$ (step 1210).

Wireless program 400 retrieves from Aspect Table 216a the address of the corresponding procedures for establishing a call between wireline telephone $101_1$ and wireless handset $102_1$ (step 1220). For example, using the determined line type as an index into Aspect Table 216a, wireless program 400 retrieves the address of the corresponding procedure in memory 210 for establishing a call between wireline telephone $101_1$ and wireless handset $102_1$. Finally, wireline program 400 executes the identified procedure to establish the call (step 1230).

Figure 13:
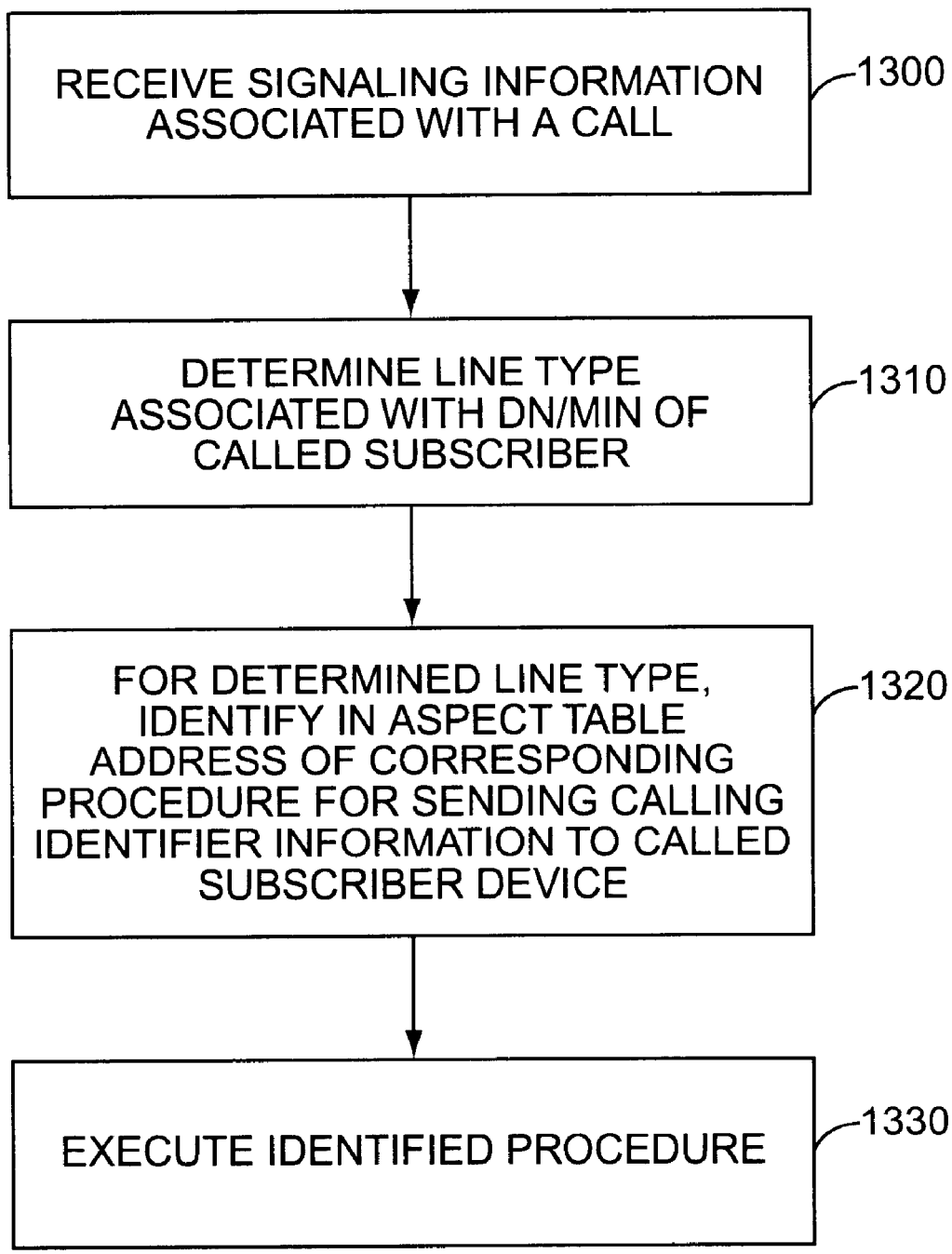
FIG. 13 is a flow chart of the steps performed by a wireline and/or wireless program in an integrated switching system for sending calling subscriber identifier information to a wireline and/or wireless device associated with a subscriber, in accordance with an embodiment of the invention.

FIG. 13 is a flow chart of the steps performed by wireline program 300 and/or wireless program 400 for sending calling identifier information to a wireline and/or wireless device, in accordance with an embodiment of the invention. In one embodiment, wireline program 300 receives via wireline signaling terminal 250.signaling information associated with a call, which is initiated by a calling subscriber, for example wireline telephone $101_1$ (step 1300). Wireline program 300 determines the line type associated with the DN and/or MIN of the called subscriber, for example wireless handset $102_1$ (step 1310). Based on the determined line type, wireline program 300 retrieves from Aspect Table 216a the address of the corresponding procedure in memory 210 for sending the calling subscriber identifier information, for example the name and DN of calling subscriber, to wireless handset $102_1$ (step 1320). Finally, wireline program 300 executes the identified procedure to send the calling subscriber identifier information to wireless handset $102_1$ (step 1330).

In another embodiment, wireless program 400 receives via wireless signaling terminal 270 signaling information associated with a call, which is initiated by a calling subscriber, for example wireless handset $102_1$ (step 1300). Wireless program 400 determines the line type associated with the DN and/or MIN of the called subscriber, for example wireline telephone $101_1$ (step 1310). Based on the determined line type, wireless program 400 retrieves from Aspect Table 216a the address of the corresponding procedure in memory 210 for sending the calling subscriber identifier information, for example the name and MIN of calling subscriber, to wireline telephone $101_1$ (step 1320). Finally, wireless program 400 executes the identified procedure to send the calling subscriber identifier information to wireline telephone $101_1$ (step 1330).

Figure 14:
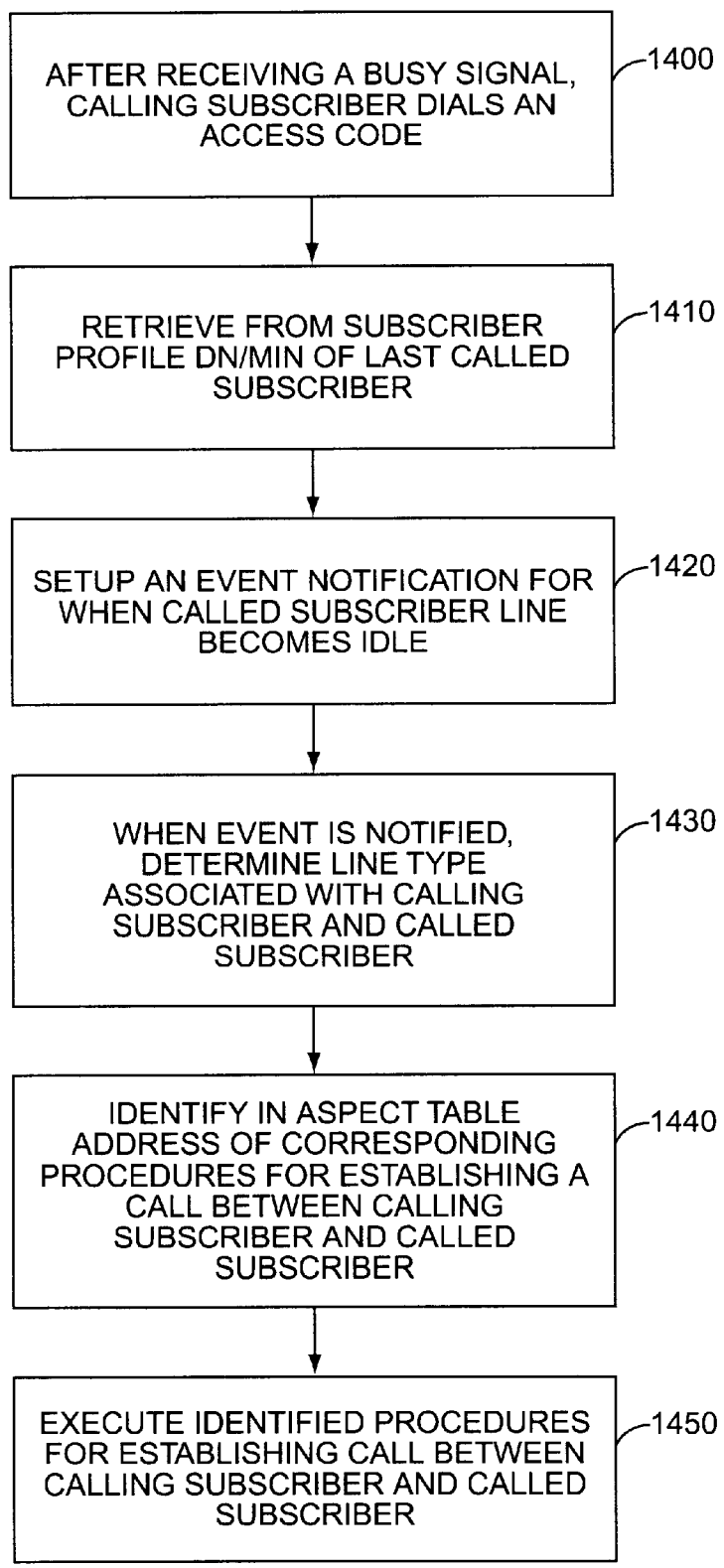
FIG. 14 is a flow chart of the steps performed by a wireline and/or wireless program in an integrated switching system for automatically calling back a calling subscriber when a called subscriber line becomes idle, in accordance with an embodiment of the invention.

FIG. 14 is a flow chart of the steps performed by wireline program 300 and/or wireless program 400 for automatically calling back a calling subscriber when a called subscriber line becomes idle, in accordance with an embodiment of the invention. In one embodiment, after receiving a busy signal from a called subscriber, for example wireless handset $102_1$, wireline program 300 receives an access code from a calling subscriber, for example wireline telephone $101_1$ (step 1400). Wireline program 300 retrieves from Wireline Subscriber Profile Table 312 an outgoing call memory, for example the MIN of the last called subscriber (e.g., wireless handset $102_1$), which wireline telephone $101_1$ called (step 1410). Wireline program 300 then sets up an event notification process, which is activated when the line associated with wireless handset $102_1$ becomes idle (step 1420). When the event is notified, wireline program 300 determines the line type associated with wireline telephone $101_1$ and wireless handset $102_1$ (step 1430).

Based on the determined line types, wireline program 300 retrieves from Aspect Table 216a the address of the corresponding procedures for establishing a call between wireline telephone $101_1$ and wireless handset $102_1$ (step 1440). For example, using the determined line types as indexes into Aspect Table 216a, wireline program 300 retrieves the addresses of the corresponding procedures in memory 210 for establishing a call between wireline telephone $101_1$ and wireless handset $102_1$. Finally, wireline program 300 executes the identified procedures to establish the call (step 1450).

In another embodiment, after receiving a busy signal from a called subscriber, for example wireline telephone $101_1$, wireless program 400 receives an access code from a calling subscriber, for example wireless handset $102_1$ (step 1400). Wireless program 400 retrieves from Wireless Subscriber Profile Table 412 an outgoing call memory, for example the DN of the last called subscriber (e.g., wireline telephone $101_1$), which wireless handset $102_1$ called (step 1410). Wireless program 400 then sets up an event notification process, which is activated when the line associated with wireline telephone $101_1$ becomes idle (step 1420). When the event is notified, wireless program 400 determines the line type associated with wireline telephone $101_1$ and wireless handset $102_1$ (step 1430).

Based on the determined line types, wireless program 400 retrieves from Aspect Table 216a the address of the corresponding procedures for establishing a call between wireline telephone $101_1$ and wireless handset $102_1$ (step 1440). For example, using the determined line types as indexes into Aspect Table 216a, wireless program 400 retrieves the addresses of the corresponding procedures in memory 210 for establishing a call between wireline telephone $101_1$ and wireless handset $102_1$. Finally, wireless program 400 executes the identified procedures to establish the call (step 1450).

Figure 15:
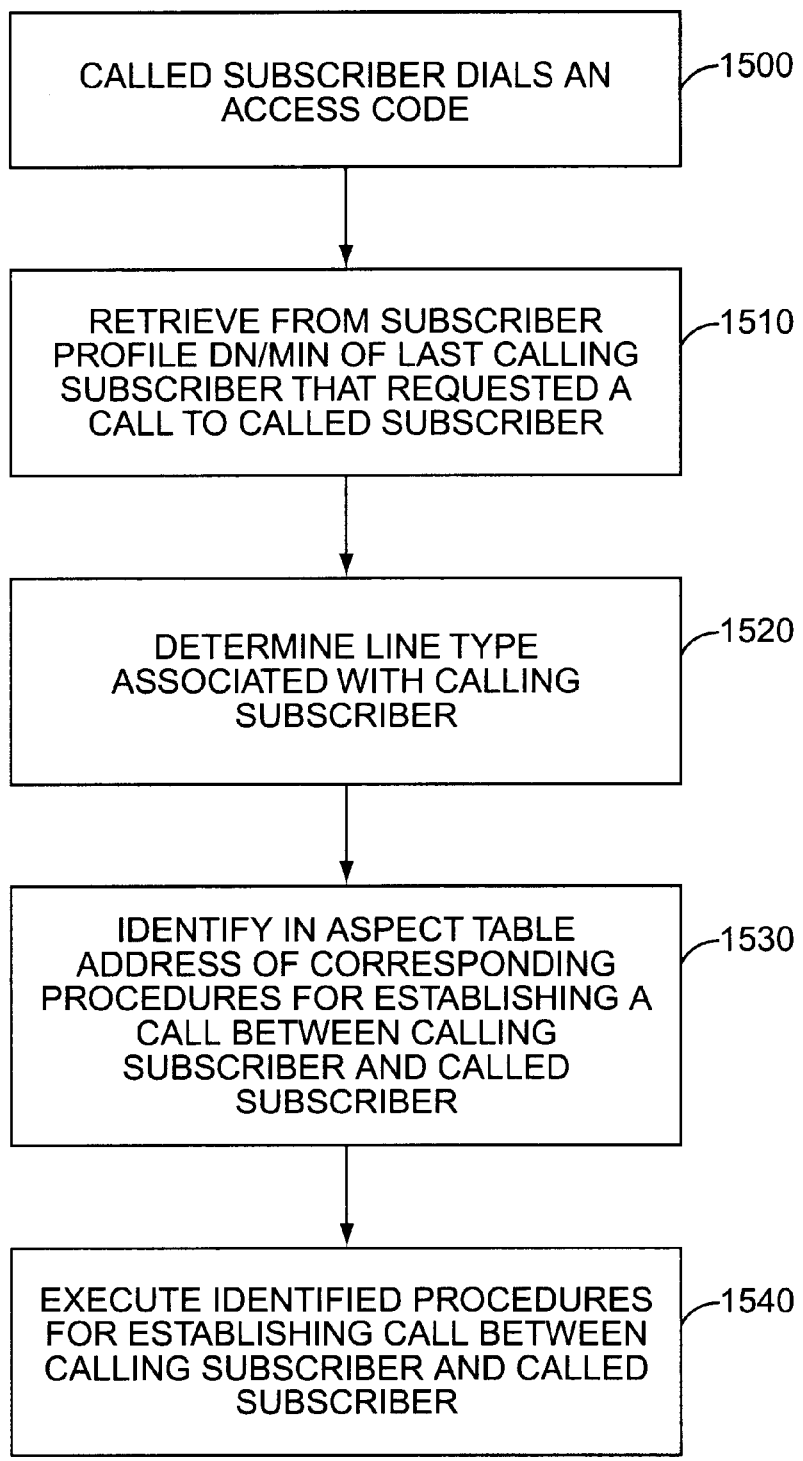
FIG. 15 is a flow chart of the steps performed by a wireline and/or wireless program in an integrated switching system for automatically calling a last calling subscriber, in accordance with an embodiment of the invention.

FIG. 15 is a flow chart of the steps performed by wireline program 300 and/or wireless program 400 for automatically recalling a last calling subscriber, in accordance with an embodiment of the invention. In one embodiment, wireline program 300 receives an access code from a called subscriber, for example wireline telephone $101_1$ (step 1500). Wireline program 300 retrieves from Wireline Subscriber Profile Table 312 an incoming call memory, for example the MIN of the last calling subscriber (e.g., wireless handset $102_1$), which called wireline telephone $101_1$ (step 1510). Wireline program 300 then determines the line type associated with wireless handset $102_1$ (step 1520).

Based on the determined line type, wireline program 300 retrieves from Aspect Table 216a the address of the corresponding procedure for establishing a call between wireline telephone $101_1$ and wireless handset $102_1$ (step 1530). For example, using the determined line type as an index into Aspect Table 216a, wireline program 300 retrieves the address of the corresponding procedure in memory 210 for establishing a call between wireline telephone $101_1$ and wireless handset $102_1$. Finally, wireline program 300 executes the identified procedures to establish the call (step 1540).

In another embodiment, wireless program 400 receives an access code from a called subscriber, for example wireless handset $102_1$ (step 1500). Wireless program 400 retrieves from Wireless Subscriber Profile Table 412, an outgoing call memory, for example the DN of the last calling subscriber (e.g., wireline telephone $101_1$), which called wireless handset $102_1$ (step 1510). Wireless program 400 then determines the line type associated with wireline telephone $101_1$ (step 1520).

Based on the determined line type, wireless program 400 retrieves from Aspect Table 216a the address of the corresponding procedure for establishing a call between wireline telephone $101_1$ and wireless handset $102_1$ (step 1530). For example, using the determined line type as an index into Aspect Table 216a, wireless program 400 retrieves the address of the corresponding procedure in memory 210 for establishing a call between wireline telephone $101_1$ and wireless handset $102_1$. Finally, wireless program 400 executes the identified procedures to establish the call (step 1540).

Figure 16:
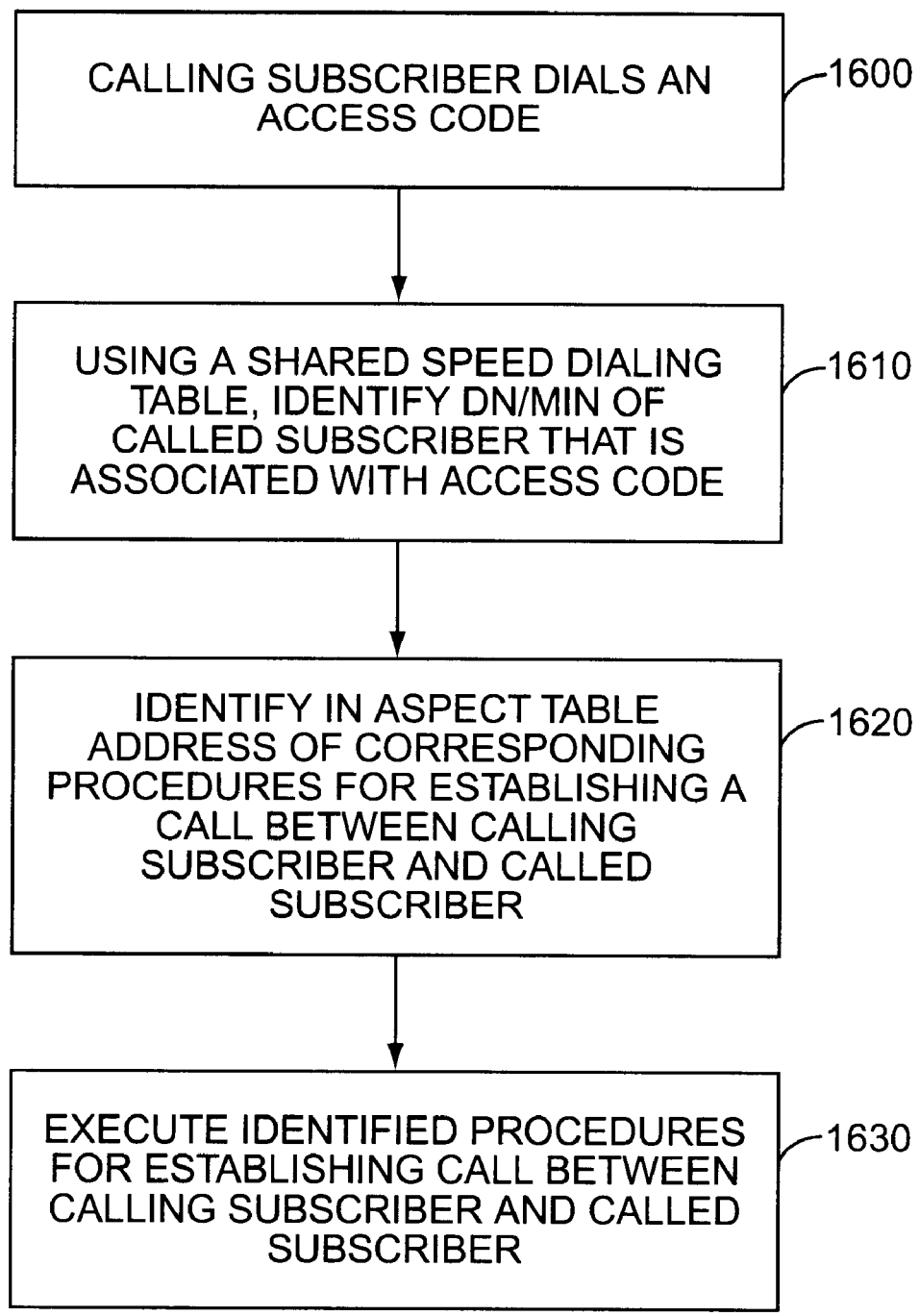
FIG. 16 is a flow chart of the steps performed by a wireline and/or wireless program in an integrated switching system for performing a speed dialing operation, in accordance with an embodiment of the invention.

FIG. 16 is a flow chart of the steps performed by wireline program 300 and/or wireless program 400 for performing a speed dialing operation, in accordance with an embodiment of the invention. In one embodiment, wireline program 300 receives an access code from a calling subscriber, for example wireline telephone $101_1$ (step 1600). Wireline program 300 identifies the DN and/or MIN of a called subscriber, for example wireless handset $102_1$, that is associated with the received access code (step 1610). For example, wireline program 300 retrieves from Wireline Subscriber Profile Table 312 the subscriber profile of the calling subscriber, and identifies the group identifier and the service class of the calling subscriber. Based on the group identifier and service class, wireline program 300 identifies the corresponding Speed Dialing Table 216c. Using the received code as an index, wireline program 300 retrieves from Speed Dialing Table 216c an entry that includes a string of digits, for example the MIN associated with wireless handset $102_1$.

After determining the line type associated with wireless handset $102_1$, wireline program 300 retrieves from Aspect Table 216a the address of the corresponding procedure for establishing a call between wireline telephone $101_1$ and wireless handset $102_1$ (step 1620). For example, using the determined line type as an index into Aspect Table 216a, wireline program 300 retrieves the address of the corresponding procedure in memory 210 for establishing a call between wireline telephone $101_1$ and wireless handset $102_1$. Finally, wireline program 300 executes the identified procedures to establish the call (step 1630).

In another embodiment, wireless program 400 receives an access code from a calling subscriber, for example wireless handset $102_1$ (step 1600). Wireless program 400 identifies the DN and/or MIN of a called subscriber, for example wireline telephone $101_1$, that is associated with the received access code (step 1610). For example, wireless program 400 retrieves from Wireless Subscriber Profile Table 412 the subscriber profile of the calling subscriber, and identifies the group identifier and the service class of the calling subscriber. Based on the group identifier and service class, wireless program 400 identifies the corresponding Speed Dialing Table 216c. Using the received code as an index, wireless program 400 retrieves from Speed Dialing Table 216c an entry that includes a string of digits, for example the DN associated with wireline telephone $102_1$.

After determining the line type associated with wireline telephone $101_1$, wireless program 400 retrieves from Aspect Table 216a the address of the corresponding procedure for establishing a call between wireline telephone $101_1$ and wireless handset $102_1$ (step 1620). For example, using the determined line type as an index into Aspect Table 216a, wireless program 400 retrieves the address of the corresponding procedure in memory 210 for establishing a call between wireline telephone $101_1$ and wireless handset $102_1$. Finally, wireless program 400 executes the identified procedures to establish the call (step 1630).

It will be understood by those skilled in the art that various changes and modifications may be made to the disclosed implementations, and equivalents may be substituted for elements thereof without departing from the true scope of the invention. In addition, many modifications may be made to adapt a particular element, technique or implementation to the teachings of the present invention without departing from the central scope of the invention. Therefore, it is intended that this invention not be limited to the particular implementations and methods disclosed herein, but that the invention include all implementations falling within the scope of the appended claims.

What is claimed is:

1. A method for use in an integrated wireline and wireless switching system comprising a shared operating system configured to perform at least one of task scheduling and processor interrupt handling, a wireline module, and a wireless module, for providing enhanced services to wireline subscribers and wireless subscribers, the method comprising the steps of:

determining a line type associated with a directory number or a mobile identification number;

identifying references to one or more shared procedures for performing one or more enhanced services according to the determined line type; and executing the identified shared procedures to perform the enhanced services.

2. The method of claim 1, wherein the identifying step comprises the step of:

identifying the references to the shared procedures for performing the enhanced services according to the determined line type without creating direct dependencies between the wireline and wireless modules.

3. The method of claim 1, wherein the identifying step comprises the step of:

identifying the references to the shared procedures for forwarding a call according to the determined line type.

4. The method of claim 1, wherein the identifying step comprises the step of:

identifying the references to the shared procedures for adding one or more subscribers to a call according to the determined line type.

5. The method of claim 1, wherein the identifying step comprises the step of:

identifying the references to the shared procedures for sending simultaneous ring signals to a plurality of devices associated with a called subscriber according to the determined line type.

6. The method of claim 1, wherein the identifying step comprises the step of:

identifying the references to the shared procedures for sending calling subscriber identification information to a called subscriber according to the determined line type.

7. The method of claim 1, wherein the identifying step comprises the step of:

identifying the references to the shared procedures for automatically calling back a called subscriber according to the determined line type when a line associated with the called subscriber becomes idle.

8. The method of claim 1, wherein the identifying step comprises the step of:

identifying the references to the shared procedures for automatically calling a last calling subscriber that calls a called subscriber according to the determined line type when the called subscriber dials an access code.

9. The method of claim 1, wherein the identifying step comprises the step of:

identifying the references to the shared procedures for performing a speed dial operation according to the determined line type when a calling subscriber dials a code.

10. A method for use in an integrated wireline and wireless switching system comprising a shared operating system configured to perform at least one of task scheduling and processor interrupt handling, a wireline module, and a wireless module, for establishing a call between a calling subscriber and a called subscriber, wherein the calling subscriber and the called subscriber are associated with a group, the method comprising the steps of:

retrieving from a shared dialing plan routing and translation information for establishing the call;

determining a line type associated with the called subscriber;

identifying references to one or more shared procedures for establishing the call according to the determined line type; and executing the identified shared procedures to establish the call.

11. A method for use in an integrated wireline and wireless switching system comprising a shared operating system configured to perform at least one of task scheduling and processor interrupt handling, a wireline module, and a wireless module, for activating message waiting indicators in a plurality of devices that are associated with a subscriber, the method comprising the steps of:

identifying directory numbers or mobile identification numbers associated with the plurality of devices;

determining line types associated with the identified directory numbers and mobile identifications;

identifying references to one or more shared procedures for activating the message waiting indicators in the plurality of devices according to the determined line types; and executing the identified shared procedures to activate the message waiting indicators.

12. A computer-readable medium capable of configuring a computer to perform a method in an integrated wireline and wireless switching system comprising a shared operating system configured to perform at least one of task scheduling and processor interrupt handling, a wireline module, and a wireless module, for providing enhanced services to wireline subscribers and wireless subscribers, the method comprising the steps of:

determining a line type associated with a directory number or a mobile identification number;

identifying references to one or more shared procedures for performing one or more enhanced services according to the determined line type; and executing the identified shared procedures to perform the enhanced services.

* * * * *